March 29, 1966 S. J. NISKIN 3,242,740
WATER SAMPLER SYSTEM
Filed May 31, 1963 4 Sheets-Sheet 1
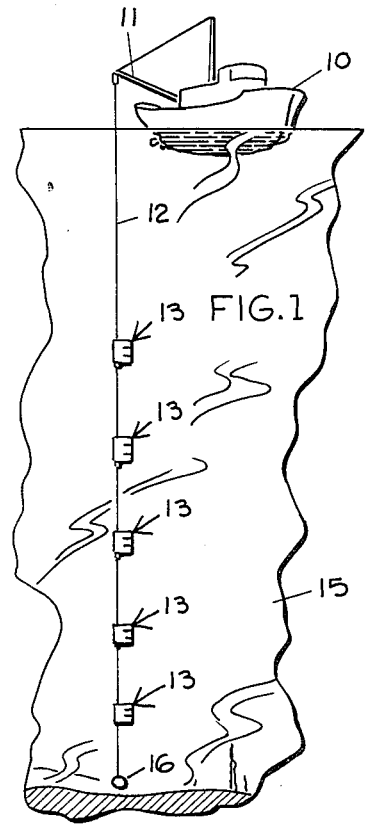
FIG.1
FIG.6
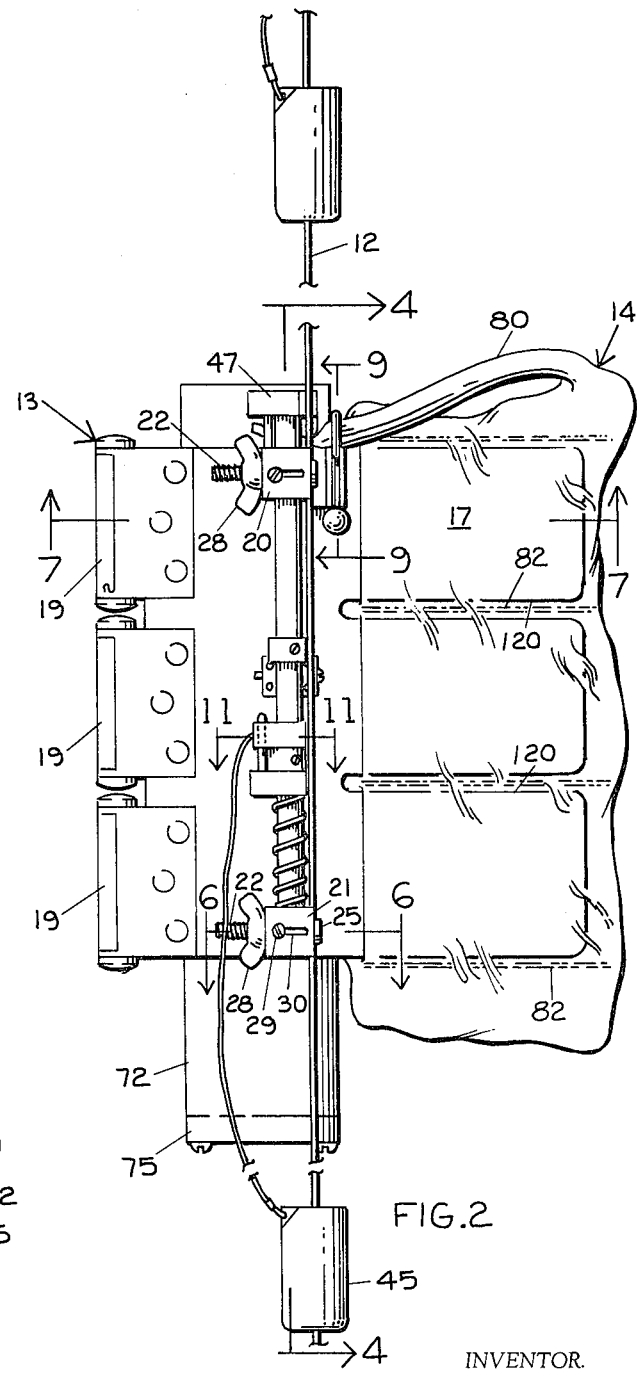
FIG.2
INVENTOR.
SHALE J. NISKIN
BY
Salvatore G. Militana
attorney March 29, 1966        S. J. NISKIN        3,242,740

WATER SAMPLER SYSTEM

Filed May 31, 1963        4 Sheets-Sheet 2

INVENTOR.
SHALE J. NISKIN
BY
Salvatore G. Militana
attorney

INVENTOR.
SHALE J. NISKIN

United States Patent Office 3,242,740
Patented Mar. 29, 1966

3,242,740
WATER SAMPLER SYSTEM
Shale J. Niskin, 9400 SW. 63rd Court, Miami, Fla.
Filed May 31, 1963, Ser. No. 284,438
13 Claims. (Cl. 73—425.4)

This invention relates to devices for obtaining water samples from the ocean and other bodies of water and is more particularly directed to a system and to the devices utilized in the system for obtaining a number of water samples substantially simultaneously at different depths.

At the present time there are three types of water sampling devices in use. The first type is the rigid sterilized, evacuated containers which consists of a rigid container having a glass tube as a spout whose outer end is sealed. When this device is at its desired depth, a messenger is dispatched to break the end of the glass tube to permit water to flow into the previously sterilized and evacuated container. The open end of the glass tube is not sealed, therefore there is a danger of both water and atmospheric contamination. Also, containers must be massive to withstand pressure differential between an evacuated container and the ambient water pressure are needed for great depths or that there be a reduction in their sizes and capacity be effected. The containers must be sterilized before each use and facilities have to be provided on a vessel for sterilizing and storing these containers. Another objection to this type of water sampling is the flow of water rushing into the evacuated container at high speeds and with such turbulence as causes an adverse effect on certain chemical and biological characteristics of the sample of water.

The second type of a water sampling device is the pre-filled sampler which is pre-filled with distilled water or a liquid disinfectant. In this device when the pre-filled receptacle has arrived at the desired depth to be sampled, the liquid is pumped out of the container as the sea water is allowed to flow into the container. The disadvantages of this device are the same as the previously discussed device in addition requiring large quantities of distilled water and the handling problems attendant thereto.

The third type of water sampling device is the rubber syringe sampler. In this device an evacuated rubber syringe is fitted to a rubber tube which has a closed capillary glass tube connected to the free end of the rubber tube. At the desired depth of water, the glass tube is broken by a messenger impact, permitting the rubber syringe to assume its normal shape to fill the rubber tube with a sample of sea water. The glass tube is not sealed after the syringe is filled. This also has the contamination problem of the other types of water sampler besides the possible failure of the syringe from expanding to its original size because of the hydrostatic pressure at certain depths. Only small quantities of water can be obtained by this method and to prevent the glass capillary tubes from being crushed by hydrostatic pressures, they have to be filled with distilled water.

In order that the optimim water sample be obtained the following conditions must be met; that the water be obtained from precisely the specific desired depth and that there be no contamination whatsoever of the sample. Contamination may be caused in the handling process, by the container or the accessories thereto, by atmospheric or other possible source and by quantities of water entering the sampler from water layers of other than the one being analyzed.

If the device or group of devices forming a system for obtaining water samples is to collect a sample that is acceptable, it must be capable of operating at any oceanic depth, be equipped with means for being actuated at the specific desired depth, have reversing thermometers with means for reversing them at the desired depth for correlation of pressure depth and of temperature with the parameters to be analyzed. Also for economical collection, the system must be suitable for simultaneous sampling at various desired depths.

The present invention contemplates the system for collecting a plurality of samples of water at different depths by the use of a pliable plastic container that is sealed and mounted in a collapsed condition on a spring loaded device. In other words, an increase in volume of the pliable container is created by the geometry of the mechanism. The container is forced to change its shape from a two dimensional configuration (flat) with zero volume to a three dimensional shape encompassing a finite volume. The relay messenger is released simultaneously with the cutting of the seal and release of the plate detent. A messenger triggers the device to cut the plastic spout of the container and open the container.

Therefore a principal object of the present invention is to provide a system for collecting samples of water at different depths of the ocean and the like that produces noncontaminated samples as well as samples whose chemical and biological characteristics have not been affected during the filling of the containers.

Another object of the present invention is to provide a system for collecting water samples in which the container is a pliable plastic requiring little storage space while the spring loaded device may be collapsed to take up very little storage space.

A further object of the present invention is to provide a system for collecting water samples with inexpensive disposable plastic containers that are readily sterilized and do not require the use of distilled water on disinfectants.

A still further object of the present invention is to provide a system of collecting water samples that can operate at any depth without the need for special equipment nor is the capacity of the containers affected or limited at great depths.

A still further object of the present invention is to provide a system of collecting water samples at different depths with each device having a relay messenger that actuates the adjacent lower water collecting device and reverses the thermometers.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

FIGURE 1 is a side elevational view of a ship at sea illustrating my system of collecting water samples and using devices embodying my invention for obtaining water samples simultaneously at various preselected depths.

FIGURE 2 is a side elevational view of my water sampler.

FIGURE 6 is a fragmentary sectional view taken along 6—6 of FIGURE 2.

Figure 3:
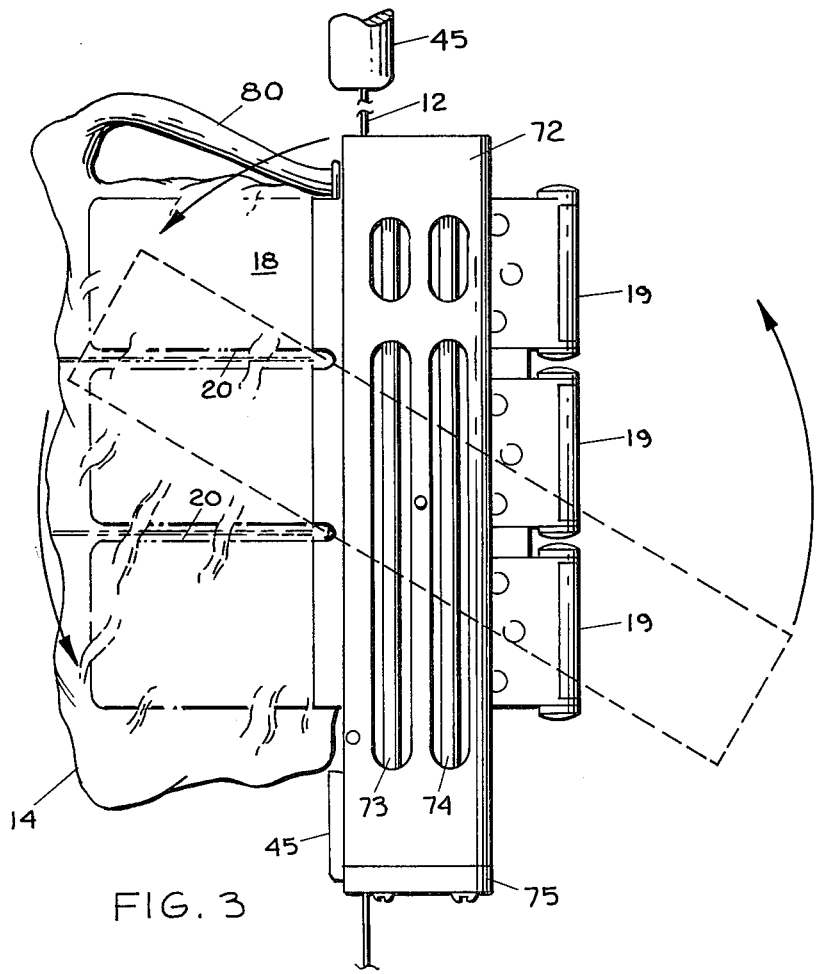
FIGURE 3 is a similar view showing the obverse side of my device.
Figure 12:
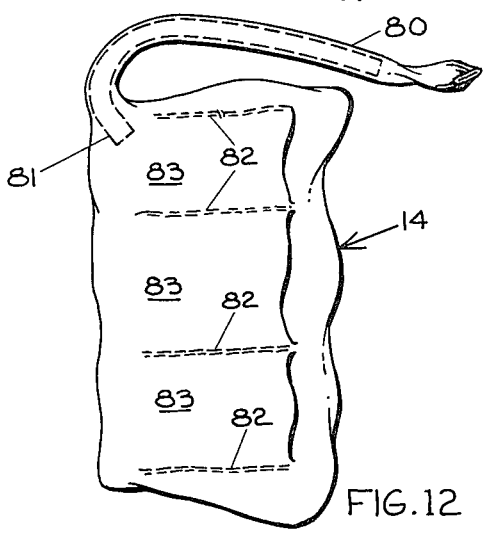
FIGURE 12 is a side view of the pliable container.

Referring to the drawings wherein like numerals are used to designate similar parts throughout the several views, there is illustrated by FIGURE 1 my invention shown in connection with a vessel 10 for obtaining simultaneous water samples at various desired depths. The vessel 10 provided with a hoist 11 has a hydrographic cable 12 extending downwardly to any desired depth with a plurality of water sampler devices 13 secured thereon. The water sampler devices 13 which are all identical in construction and operation to fill a pliable container 14 with water are placed at certain designated intervals on the cable 12 in order to obtain the water sample at the desired depths in the body of water or ocean 15. The cable 12 is weighted as at 16 at the end of the line to maintain the cable 12 in as vertical a position as possible so that the sampler devices 13 will be at the proper depths or in proximity thereto when actuated to obtain the water sample desired.

The water sampler device 13 consists of a pair of plate members or leaves 17 and 18 hinged at one end as by spring biased hinge members 19. Both plate members 17 and 18 are slotted as at 120 which slots 120 extend horizontally from the outer edge of the plate members 17, 18 to approximately the mid-portion thereof. Their functions are explained in detail hereinafter. Each of the plate members 17, 18 are provided with a vertically disposed slot 31 at the mid-portion of the plates. Mounted at the upper and lower portion of the plate member 17 are brackets 20 and 21 which support cable fastening members and the operating mechanism.

The cable fastening members are best shown by FIGURE 6 consisting of a bolt 22 extending through a bore 23 in the brackets 20 and 21. The bore 23 is enlarged as at 24 to receive a head 25 of the bolt 22. The bolt 22 is provided with a semi-circular slot 26 which is in juxtaposition with a similar semi-circular slot 27 in the bracket 21 (20) along the bore 23. The hydrographic cable 12 which extends through slots 26, 27 is firmly held between the head 25 of the bolt 22 and the bracket 21 (20) by a wing nut 28 threaded tightly on the bolt 22 thus securing the sampler device 13 on the cable 12 to place the devices 13 at desired depths in the ocean. To prevent the bolts 22 from turning during the operation of tightening or loosening them and from being removed from the brackets 20 and 21, a screw bolt 29 is secured to the bolt 22 and extends through an elongated slot 30 in the bracket 21 (20).

Figures 4, 5:
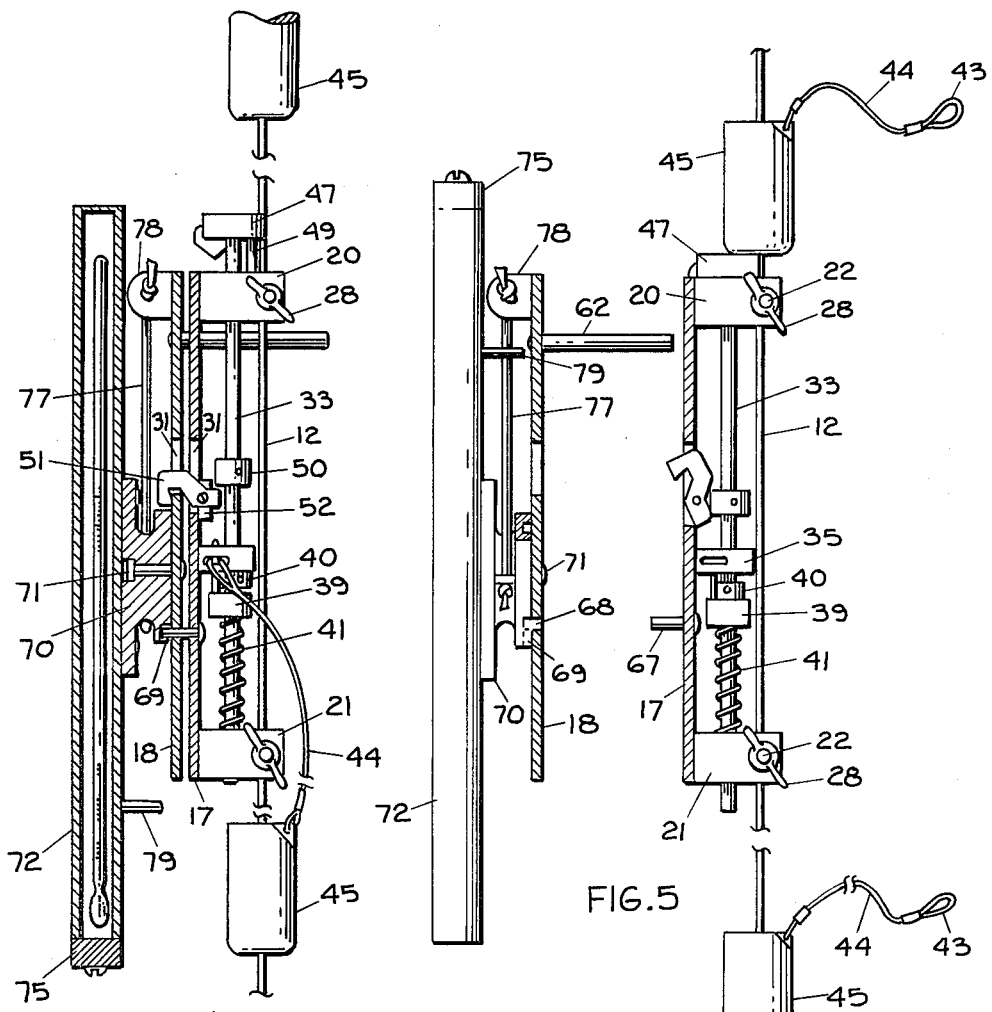
FIGURE 4 is a longitudinal cross sectional view taken along the line 4—4 of FIGURE 2.
FIGURE 5 is a similar view showing my sampler in an operated or opened position.
Figure 11:
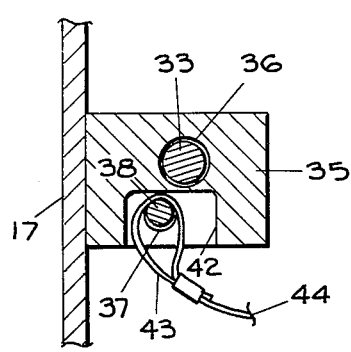
FIGURE 11 is a cross sectional view taken along the line 11—11 of FIGURE 2.
Figure 7:
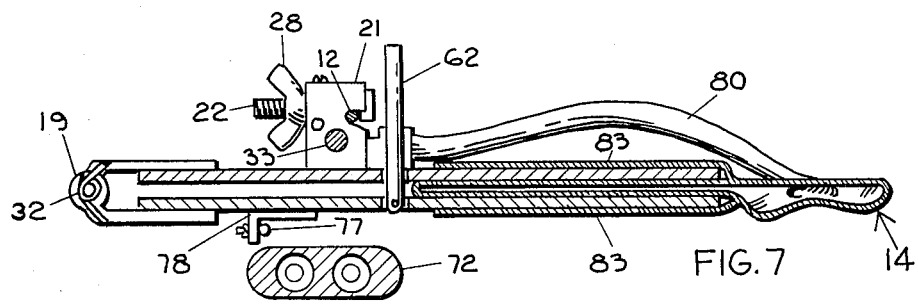
FIGURE 7 is a transverse sectional view taken along the line 7—7 of FIGURE 2.

Means are provided for supporting the operating mechanism on the brackets 20, 21 comprising a slidable shaft 33 whose end portions are slidably mounted in bores 34 in the brackets 20 and 21, a third bracket 35 mounted at approximately the mid-portion of the plate member 17 is provided with a bore 36 for the shaft 33 to be slidably positioned therein as shown by FIGURE 11. The bracket 35 is further provided with a bore 37 for receiving an upwardly extending pin 38 mounted on a sleeve 39 slidably mounted on the shaft 33. A collar 40 secured to the shaft 33 is positioned between the slidable sleeve 39 and the bracket 35 to limit the upward movement of the shaft 33 and compel the sleeve 39 to slide downwardly with the downward movement of the shaft 33. A coil spring 41 mounted on the shaft 33 is interposed between the bracket 21 and the sleeve 39. The bracket 35 is provided with a slot 42 in its side wall at the position of the bore 37 to permit a loop 43 of a messenger line 44 to extend therein and be engaged by the pin 38. A weighted messenger 44 slidably positioned on the hydrographic cable 12 and secured to the end of the line 44. Upon the downward sliding movement of the shaft 33, the collar 40 will slide downwardly to cause the sleeve 39 and pin 38 likewise to slide away from the bracket 35. When the top of the pin 38 is positioned below the level of the slot 42 the loop 43 will become free of the pin 38. The weighted messenger 45 will now slide downwardly as shown by FIGURE 5 toward the lower adjacent water sampler 13 to actuate it as is explained hereinafter.

At the top end of the shaft 33 is a head 47 that limits the downward sliding movement of the shaft 33. Secured to the side of the head 47 is a knife blade 48. Also depending from the head 47 is a pin 49 which extends into a bore formed in the bracket 20 to prevent rotation of the shaft 33.

A second collar 50 is secured to the shaft 33 for actuating a detent 51 pivoted as at 52 to the plate member 17. The detent 51 extends through the openings 31 of the plate members 17 and 18 to hold the plate members 17 and 18 together as shown by FIGURE 4 against the spring pressures of the hinges 19 which are yieldingly urging the plate members 17 and 18 to swing outwardly away from each other. When the shaft 33 is made to slide downwardly the collar 50 will engage the end of the detent 51 causing the detent 51 to swing clockwise as shown in FIGURES 4 and 5 to release the plate members 17 and 18.

Figures 9, 10:
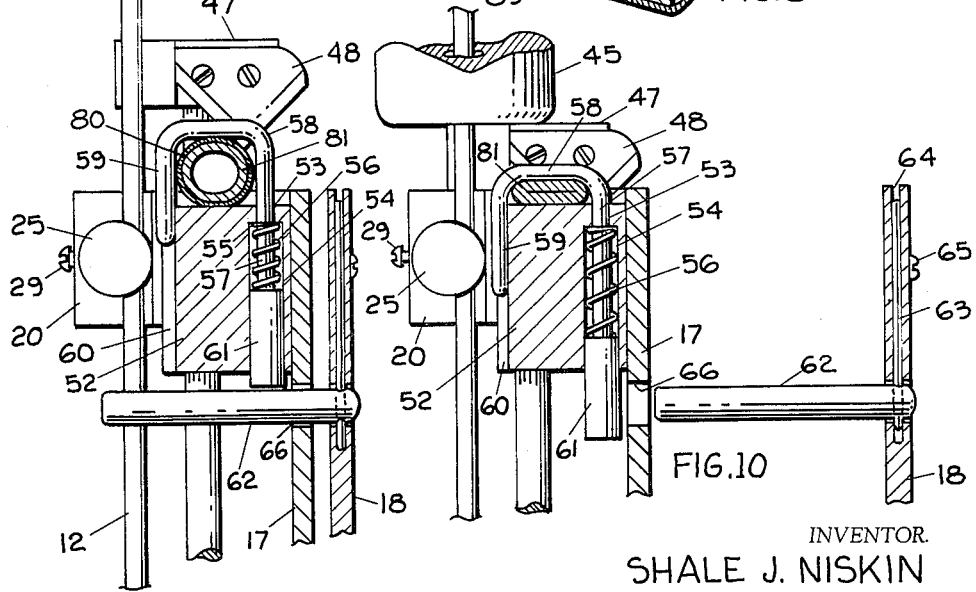
FIGURE 9 is a fragmentary cross sectional view taken along the line 9—9 of FIGURE 2.
FIGURE 10 is a similar view showing the device in an open position.

Adjacent to the upper bracket 27 is a support bracket 52 secured to the plate member 17. The bracket 52 is provided with concentric vertical bores 53 and 54 forming a shoulder 55 against which a coil spring 56 bears. The bores 53 and 54 receive a leg portion 57 of a U-shaped sealing member 58 whose other leg portion 59 is slidably positioned in a slot 60 formed on the outside surface of the bracket 52. A member 61 secured to the end of the leg portion 57 is slidably positioned in the bore 54 and engages the other end of the coil spring 56 whereby the U-shaped seal member 58 is yieldingly urged in a downward direction. Downward movement of the seal member 58 is prevented when the plate members 17 and 18 are together as shown by FIGURE 9 by an elongated stop member 62 extending in the path of the end member 61. The stop member 62 is fastened at one end to the plate member 18 by a pin 63 extending in a bore 64 in the plate member 18 through the end of the stop member 62. The pin 63 is secured in position by a screw 65 as shown by FIGURE 10. The free end of the stop member extends through a bore 66 in the plate member 17. When the plate members 17 and 18 have swung to their open position as shown by FIGURE 10, the free end of the stop member 62 will slide away from beneath the end member 61 to permit the spring pressure 56 to compel the seal member 58 to slide downwardly and seal a tube or spout 80 positioned therein.

A second stop member 67 is mounted on the plate member 17 extending through a bore 68 in the plate member 18 and into a slot 69 formed in a rotatable hub 70. The hub 70 is rotatably mounted by a pin 71 to the outer surface of the plate member 18. Secured to the rotatable hub 70 is a thermometer case or jacket 72 having a pair or more of chambers for receiving thermometers 73 and 74. The thermometer case 72 is provided with suitable openings for reading the thermometers 73 and 74 and a cover 75 removably secured at one end to gain access to the thermometers in the case 72. The thermometers 72 and 73 are reversing thermometers which register permanently the temperature at the time their positions are reversed. One of the thermometers is an exposed thermometer, while the other is shielded from the water pressure. By virtue of these two readings the temperature and the precise depth at which the thermometer readings are taken can be computed.

Means are provided to compel the hub 70 and thermometer case 72 to rotate comprising a bracket 76 secured to the plate member 18 having a resilient member 77 secured at one end thereto while the other end of the resilient member is wound partially about the hub 70 and secured to a tab 78. As best shown by FIGURES 3 and 4, when the plate members 17 and 18 have swung to their open position the stop in 67 emerges from the slot 69 to free the hub 70 which now begins to rotate on the pin 71 under the force of the resilient member 77. The thermometer case 72 rotates 180 degrees until a stop pin 79 mounted on the thermometer case 72 engages the resilient member 77 as seen in FIGURE 5.

The water container 14 which is normally in a deflated or folded condition is made of a sheet of pliable plastic material formed into a bag with the edges sealed. The spout 80 which connects one corner of the container 14 and has its end portion sealed. Within the plastic spout 80 there is inserted a thick walled elastic tubing 81 which supports the walls of the plastic spout 80 so that the pressure of water will not collapse the spout 80 to prevent water from flowing into the container 14 after the seal has been cut.

The container 14 is provided with a plurality of sleeve portions formed by placing a sheet of plastic on each side of the bag 14 and sealing same along four seams 82, the other edges of the sheet of plastic remaining unsealed to form three sleeves 83.

In readying my water sampler 13 for obtaining a sample of sea water, the device 10 is brought to its closed position with the plate members 17 and 18 in close spaced relation. In this condition, the stop member 62 will be supporting the spout sealing member 58 in its elevation position. The stop member 67 will be found in the slot 69 to prevent rotation of the thermometer case 72 the latter having been rotated 180 degrees against the resilient force 77. The loop 43 of the messenger 45 will be engaged by the pin 38 within the slot 42 and the detent 51 engages the plate member 18 to hold the plate members 17 and 18 in their closed position. The coil spring 41 maintains the head 47 and the cutter 48 in their elevated position. The container 14 is then slipped into the device 13 between the plate members 17 and 18 with the sleeves 83 on each side of the container 14 receiving the plate members 17 and 18 and the seams 82 sliding along the slots 20 of the plate members. The spout 80 is then inserted beneath the elevated tube sealing member 58 and the knife blade 48, the member 58 holding the spout 80 firmly in position.

The samplers 13 are now ready to be placed on the hydrographic cable 12. The wing nuts 28 are loosened to permit the heads 25 to be slid away from the brackets 21 and allow the cable 12 to be slipped into the slots 26 which are now exposed. As the wing nuts 28 are tightened the heads 25 slide inwardly of the bores 24 carrying the cable 12 inwardly until the cable 12 is squeezed tightly by the heads 25 against the arcuate slots 27. The weighted messengers 45 are slidably mounted on the cable 12 in their proper positions with their respective loop portions 43 engaged by the pins 38 as aforesaid.

Figure 8:
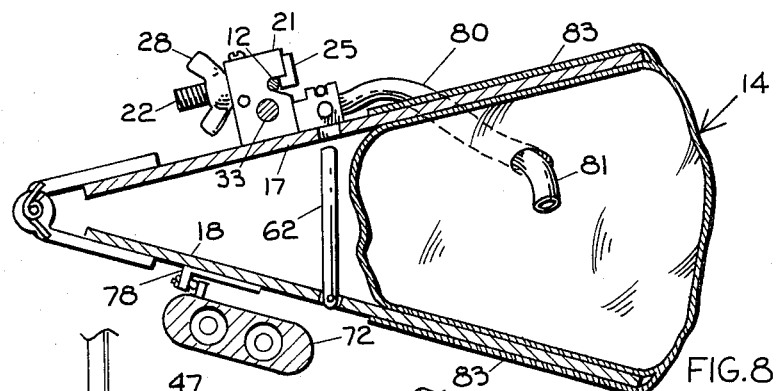
FIGURE 8 is a similar view showing my water sampler in an open position.

The cable 12 with the plurality of sampler devices 13 positioned thereon is then put over the side of the vessel 10 as illustrated by FIGURE 1. When the proper amount of cable 12 has been let out so as to place the weight 16 on or above the ocean bottom as planned, the first messenger 45 is released manually to slide down the cable 12 to strike the head 47 of the topmost sampler 13. The force of the messenger 45 will cause the shaft 33 to slide downwardly against the spring pressure 41. The blade 48 will slide downwardly to cut the sealed end of the spout 80. Simultaneously therewith, the collar 50 will actuate the detent 51 to release the plate member 18 simultaneously with the release of the relay messenger 45. The spring biased hinges 19 will now cause the plates 17, 18 to open outwardly causing the sampler container 14 to become enlarged or opened as best shown by FIGURE 8. Water from the ocean will flow into the bag 14 because of the partial vacuum that is created therein as the plate members 17, 18 continue to swing away from each other and the sides of the bag 14 spread apart. The stop pin 67 carried by the plate member 17 will release the hub 70 to cause the thermometer case 72 to rotate 180° and thereby register the temperature of the water at the depth the sample is being taken. As the shaft 33 reaches it lowermost position, the collar 40 that is secured to the shaft 33 will cause the pin 38 to slide downwardly until the loop 43 is released. At this time the messenger attached to that particular released loop 43 is freed to slide downwardly on the cable 12 to strike the head 47 of the adjacent lower sampler 13 and commence its cycle of operation to fill the container 14 with sea water.

After the container 14 has been filled to capacity with sea water, the plate members 17 and 18 have swung to a position wherein the stop member 62 carried by the plate member 18 has left the bore 66 in the plate member 17 and released the end member 61. The spring pressure 56 will now take over and cause the sealing member 58 to slide downwardly against the spout 80 to seal the tube 81 as best seen in FIGURE 10. The water sampler container 14 is now filled with water taken from the desired and known depth with the spout 81 sealed to prevent contamination of the sample.

Upon the elapse of a short period of time after the first messenger 45 was released, all of the water samplers 13 will have been actuated, the bags 14 filled with water and their respective spouts 80 sealed. The cable 12 is then hoisted on deck and each of the samplers 13 removed from the cable 12 by merely unloosening the wing nuts 28. The containers 14 of water samples are removed from the sampler 13 and a notation made of its thermometer readings. After the sample of water has been removed from the plastic containers 14, they can be disposed since the cost of the container 14 would amount to less than the cost of sterilizing equipment. The samplers 13 can then be used for obtaining further samples of water by placing sterile plastic containers thereon as explained hereinabove and the devices adjusted for actuation by the messengers 45.

Having disclosed my invention, what I claim as new and desire to secure by Letters Patent of the United States is:

1. A water sampler comprising a pair of container support members, resilient means yieldingly urging said container support members in a direction away from each other, detent means releasably securing said container support members in close proximity to each other, a pliable container having side walls positioned between said support members, means mounted on outer surfaces of said side walls and engaged by support members for pulling said side walls in a direction away from each other, said pliable container being sealed in a deflated condition, means for unsealing said sealed container, means for releasing said detent means, messenger means actuating said unsealing and said detent releasing means and further means sealing said pliable container after becoming substantially filled with water.

2. A water sampler comprising a pair of container support members, means pivotally mounting said support members, resilient means urging said support members to swing in a direction away from each other, detent means mounted on either of said support members releasably securing said other support member in close proximity to each other, a pliable container in a deflated condition positioned between said support members, means securing said pliable containers to said support members whereby upon the swinging of said support members by said resilient means the volume of said deflated container will become enlarged, said container having a sealed spout, means unsealing said sealed spout, messenger means actuating said unsealing means and said detent means and sealing means for said spout actuated by said support members when said support members have swung to a predetermined position.

3. A water sampler comprising a pair of container support members, means pivotally mounting said support members, resilient means urging said support members to swing in a direction away from each other, detent means mounted on either of said support members releasably securing said other support member in close proximity to each other, a pliable container in a deflated condition position between said support members, means securing said pliable containers to said support members whereby upon the swinging of said support members by said resilient means the volume of said deflated container will become enlarged, said container having a sealed spout, means mounted on one of said support members cutting said sealed spout and thereby unsealing said pliable container, messenger means actuating said detent means and said cutting means substantially simultaneously, and sealing means mounted on said one of said support members for sealing said spout when said support members have swung to a predetermined position and the volume of said pliable container has been enlarged and substantially filled with water.

4. A water sampler comprising a pair of plate members, hinge means pivotally mounting said plate members along one edge, spring means yieldingly urging said plate members to swing outwardly, a detent pivotally mounted on one of said plate members and engaging the other plate members maintaining said plate members in closed position, a pliable container having side portions positioned between said plate members, sleeve members mounted on said container side portions engaging said plate members whereby upon the outward swinging of said plate members said side portions of said pliable container will be pulled away from each other to enlarge said container, a sealed spout connected to said container, a shaft slidably mounted on said one of said plate members, a cutting blade mounted on said shaft for cutting said spout, a collar secured to said shaft in proximity of said detent for releasing said plate members, messenger means for sliding said shaft and causing said cutting blade to cut said spout and release said plate members whereby said pliable container becomes inflated, spout sealing means mounted on either of said plate members and engaging said spout, resilient means urging said spout sealing means in a direction to seal said spout, means mounted on the other of said plate members restraining the actuation of said spout sealing means until said plate members have swung outwardly to a predetermined position.

5. The structure as recited by claim 4 taken in combination with thermometer supporting means rotatably mounted on said other of said plate members, means yieldingly urging the rotation of said thermometer supporting means and further means effecting the rotation of said thermometer supporting means upon the the swinging of said plate members in an outward direction.

6. A water sampler comprising a pair of plate members, hinge means pivotally mounting said plate members along one edge, spring means yieldingly urging said plate members to swing outwardly, a detent pivotally mounted on one of said plate members and engaging the other plate members maintaining said plate members, in closed position, a pliable container having side portions positioned between said plate members, sleeve members mounted on said container side portions engaging said plate members whereby upon the outward swinging of said plate members said side portions of said pliable container will be pulled away from each other to enlarge said container, a sealed spout connected to said container, a shaft slidably mounted on said one of said plate members, a cutting blade mounted on said shaft for cutting said spout, a collar secured to said shaft in proximity of said detent for releasing said plate members, messenger means for sliding said shaft and causing said cutting blade to cut said spout and release said plate members whereby said pliable container becomes inflated, spout sealing means mounted on either of said plate members and engaging said spout, resilient means urging said spout sealing means in a direction to seal said spout, means mounted on the other of said plate members restraining the actuation of said spout sealing means until said plate members have swung outwardly to a predetermined position, thermometer supporting means rotatably mounted on said other of said plate members, resilient means yieldingly urging said thermometer supporting means to rotate, stop means restraining said rotational movement until said plate members have swung outwardly away from each other.

7. A water sampler system comprising a cable, a plurality of water samplers secured to said cable, each of said water samplers comprising a pair of container support members, resilient means yieldingly urging said container support members in a direction away from each other, detent means releasably securing said container support members in close proximity to each other, a pliable container mounted on said support members, said pliable container being sealed in a deflated condition, means unsealing said sealed container, means releasing said detent means, messenger means releasably secured to each of said water samplers and slidably mounted on said cable for actuating said unsealing means and said detent means of a lower adjacent water sampler and further means mounted on each of said water samplers sealing said pliable container after becoming substantially filled with water.

8. A water sampler system comprising a cable, a plurality of water samplers secured to said cable, each of said water samplers comprising a pair of container support members, means pivotally mounting said support members, resilient means urging said support members to swing in a direction away from each other, detent means mounted on either of said support members releasably securing said other support member in close proximity to each other, a pliable container in a deflated condition position between said support members, means securing said pliable containers to said support members whereby upon the swinging of said support members by said resilient means said deflated container will become enlarged, said container having a sealed spout, means unsealing said sealed spout, messenger means releasably secured to each of said water samplers and slidably mounted on said cable for actuating said unsealing and detent means of a lower adjacent water sampler and sealing means for said spout mounted on each of said samplers actuated by said container support members when the latter have swung to a predetermined position to substantially fill said container with water.

9. A water sampler system comprising a cable, a plurality of water samplers secured to said cable, each of said water samplers comprising a pair of plate members, hinge means pivotally mounting said plate members along one edge, spring means yieldingly urging said plate members to swing outwardly, a detent pivotally mounted on one of said plate members and engaging the other plate members maintaining said plate members in closed position, a pliable container having side portions positioned between said plate members, sleeve members mounted on said container side portions engaging said plate members whereby upon the outward swinging of said plate members said side portions of said pliable container will be pulled away from each other to enlarge said container, a sealed spout connected to said container, a shaft slidably mounted on said one of said plate members, a cutting blade mounted on said shaft for cutting said spout, a collar secured to said shaft in proximity of said detent for releasing said plate members, messenger means releasably secured to said shaft of said water samplers and slidably mounted on said cable for actuating said shaft of a lower adjacent water sampler to cause said cutting blade to cut said spout, release said plate members and said messenger whereby said pliable container becomes inflated, spout sealing means mounted on either of said plate members and engaging said spout of each of said water samplers, resilient means urging said spout sealing means in a direction to seal said spout, means mounted on the other of said plate members restraining the actuation of said spout sealing means until said plate members have swung outwardly to a predetermined position.

10. The structure as recited by claim 9 taken in combination with thermometer supporting means rotatably mounted on each of said water sampler devices, means yieldingly urging the rotation of said thermometer supporting means and further means effecting the rotation of said thermometer supporting means upon the swinging of said plate members in an outward direction.

11. A pliable container for water samplers comprising a member having a pair of side wall portions forming an enclosed chamber, a spout communicating with said chamber, said spout being sealed at its free end and a tubular member telescopically mounted in said spout and extending into said chamber, said tubular member having firmer side wall portions than said spout and means mounted on the outer surface of said side wall portions for pulling said side wall portions in a direction away from each to inflate said container.

12. A pliable container for water samplers comprising a member having a pair of side wall portions secured along their edge portions to form a chamber, a spout communicating with said chamber, said spout being sealed at its free end and a tubular member telescopically mounted in said spout and extending into said chamber, said tubular member having firmer side wall portions than said spout and plurality of sleeve portions mounted on said side wall portions, said sleeve portions adapted to receive members therethrough for withdrawing the side wall portions in a direction away from each other to inflate said container.

13. A water sampler comprising a pair of container support members in relatively close proximity to each other, resilient means yieldingly urging said container support members in a direction away from each other, detent means releasably securing said container support members in close proximity to each other, a pliable container having side walls positioned between said support members in a deflated condition with said side walls in contact with each other, means mounted on the outer surfaces of said pliable container and engaged by said support members whereby upon actuation of said detent said support members will pull said side walls of said pliable container in a direction away from each other to inflate said pliable container.

References Cited by the Examiner
UNITED STATES PATENTS

| | | | |
|---|---|---|---|
| 2,349,962 | 5/1944 | Harris | 222—107 X |
| 2,391,978 | 1/1946 | Kahl | 73—425.4 |
| 2,411,157 | 11/1946 | Fene et al. | 73—421 |
| 3,007,608 | 11/1961 | Cox | 73—421 |
| 3,176,517 | 4/1965 | Chelminski | 73—425.4 |

DAVID SCHONBERG, *Primary Examiner.*

LOUIS R. PRINCE, S. C. SWISHER,
*Assistant Examiners.*